United States Patent [19]
Carr

[11] Patent Number: 4,761,015
[45] Date of Patent: Aug. 2, 1988

[54] APPARATUS FOR TOWING A VEHICLE

[75] Inventor: Larrey Carr, 483 E. Springer La., Lodi, Calif. 95240

[73] Assignees: Larrey Carr, Lodi, Calif.; Fredrick R. Meyers, both of Lodi, Calif.

[21] Appl. No.: 60,647

[22] Filed: Jun. 11, 1987

[51] Int. Cl.$^4$ .............................................. B60P 3/06
[52] U.S. Cl. ................... 280/402; 280/491 A; 414/563
[58] Field of Search ................... 280/402, 482, 491 R, 280/491 A, 491 B; 414/563, 428, 429

[56] References Cited

U.S. PATENT DOCUMENTS

| | | | |
|---|---|---|---|
| 2,449,146 | 9/1948 | Ryan | 414/563 |
| 3,690,482 | 9/1972 | Gaumont | 280/402 X |
| 3,751,072 | 8/1973 | Williams | 280/491 B |
| 4,473,237 | 9/1984 | Lind | 414/563 X |
| 4,573,857 | 3/1986 | Porter, Sr. et al. | 280/402 X |
| 4,632,629 | 12/1986 | Kooima | 280/402 X |
| 4,634,337 | 1/1987 | Hamman | 280/402 X |
| 4,679,978 | 7/1987 | Holmes et al. | 414/563 |

FOREIGN PATENT DOCUMENTS 58-112838  7/1983  Japan ..................... 414/563

*Primary Examiner*—John J. Love
*Assistant Examiner*—Charles R. Watts
*Attorney, Agent, or Firm*—Mark C. Jacobs

[57] ABSTRACT

Apparatus for towing a vehicle is disclosed having a first member mounted in a stowed position under the undercarriage of the tow vehicle and a second member telescopingly mounted within the first member and movable to an extended position out of the first member when the first member is released from its stowed position. A cross member is mounted at the free end of said second member and transverse thereto and has a towing vehicle wheel support at each end for receiving the front wheels of a vehicle to be towed. Straps are associated with each wheel support to secure the wheels of the vehicle to be towed to the wheel supports. In this manner, a front wheel drive vehicle can be towed without effecting the odometer and the apparatus can be stored under the undercarriage of the tow vehicle when not in use.

9 Claims, 5 Drawing Sheets

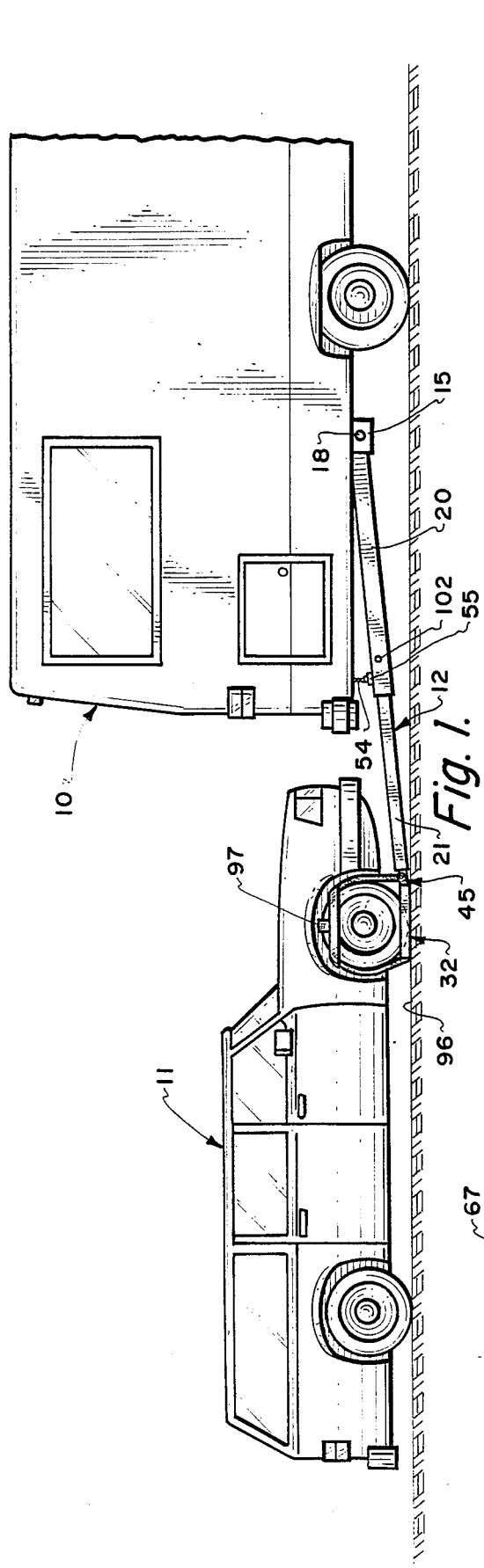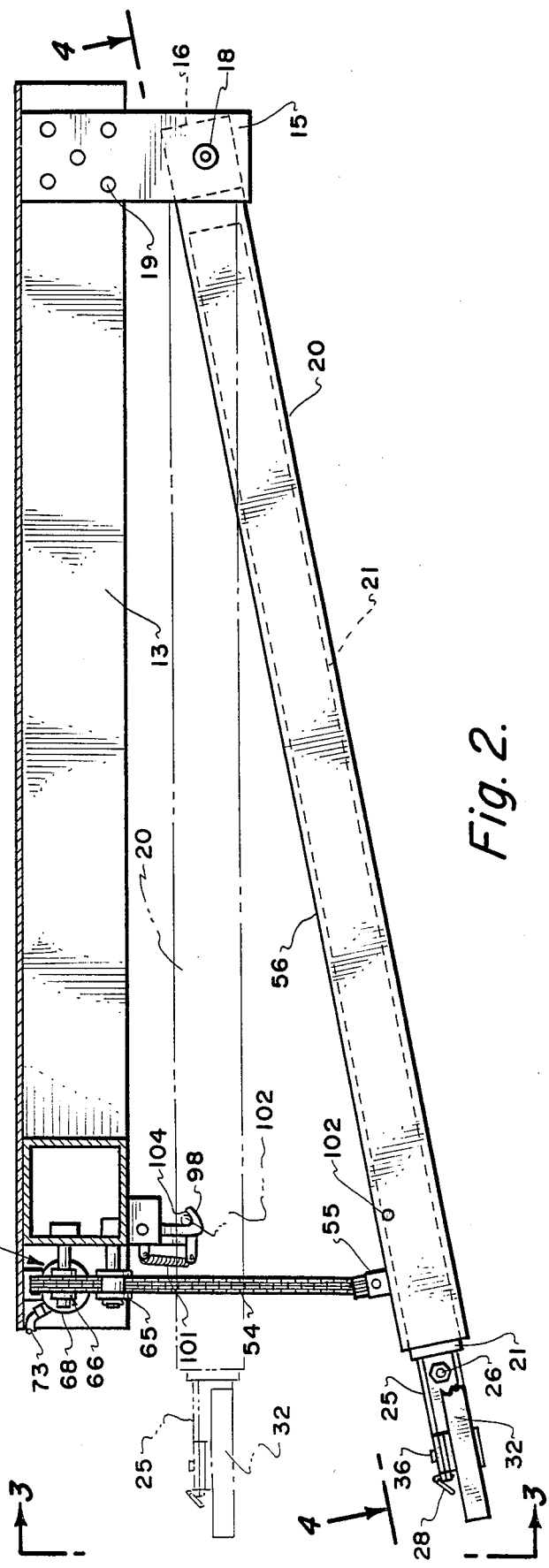

APPARATUS FOR TOWING A VEHICLE

BACKGROUND OF THE INVENTION

1. Field of the Invention

The invention relates to vehicle towing apparatus; and, more particularly, to apparatus stowed under the undercarriage of a tow vehicle which can be used to tow a vehicle.

2. Description of the Prior Art

There are many occasions when one wishes to two a vehicle regularly as a matter of course. For example, one may have a motor home or other recreational vehicle which is set up in one location in a campground or the like, and a smaller vehicle which is used for day to day activities. One of the problems encountered in towing such auxillary vehicles is that, when using tow bars or the like, the odometers of such vehicles are actuated while the vehicle is being towed thus adding unnecessarily to the mileage thereof and providing wear and tear on the front wheels. Also, such tow bars must be connected and disconnected and stored after use. One of the solutions to this problem is to use a trailer or the like on which the vehicle being towed is mounted. HOwever, such a trailer must be stored separately, set up when needed, is expensive to buy and maintain, and must be licensed in the state of use.

There is thus a need for vehicle towing apparatus which provides easy set-up and storage and does not add to the mileage of the vehicle being towed.

SUMMARY OF THE INVENTION

It is an object of this invention to provide apparatus for towing a vehicle which forms part of the tow vehicle.

It is an object of this invention to carry out the foregoing object wherein the apparatus is stowed in an out of the way location on the tow vehicle.

It is a further object of this invention to carry out the foregoing objects without adding to the mileage of the vehicle being towed.

It is still another object of this invention to provide improved vehicle towing apparatus which is easy to set up, use and store when not in use.

These and other objects are preferably accomplished by providing a first member mounted in a stowed position under the undercarriage of a tow vehicle and a second member telescopingly mounted within the first member and movable to an extended position out of the first member when the first member is released from its stowed position. A cross member is mounted at the free end of the second member and transverse thereto and has a towed vehicle wheel support at each end for receiving the front wheels of a vehicle to be towed. Straps are associated with each wheel support to secure the wheels of the vehicle to be towed to the wheel supports. In this manner, a front wheel drive vehicle can be towed without affecting the odometer and the apparatus can be stored under the undercarriage of the tow vehicle when not in use. A rear wheel drive vehicle may also be towed in like manner by disconnecting the driveline of the transmission.

BRIEF DESCRIPTION OF THE DRAWING

FIG. 1 is a side view of a tow vehicle and a vehicle being towed using the apparatus of the invention;

FIG. 2 is an elevational side view of a portion of the tow vehicle of FIG. 1 and the towing apparatus of the invention;

DESCRIPTION OF THE PREFERRED EMBODIMENT

Figure 3:
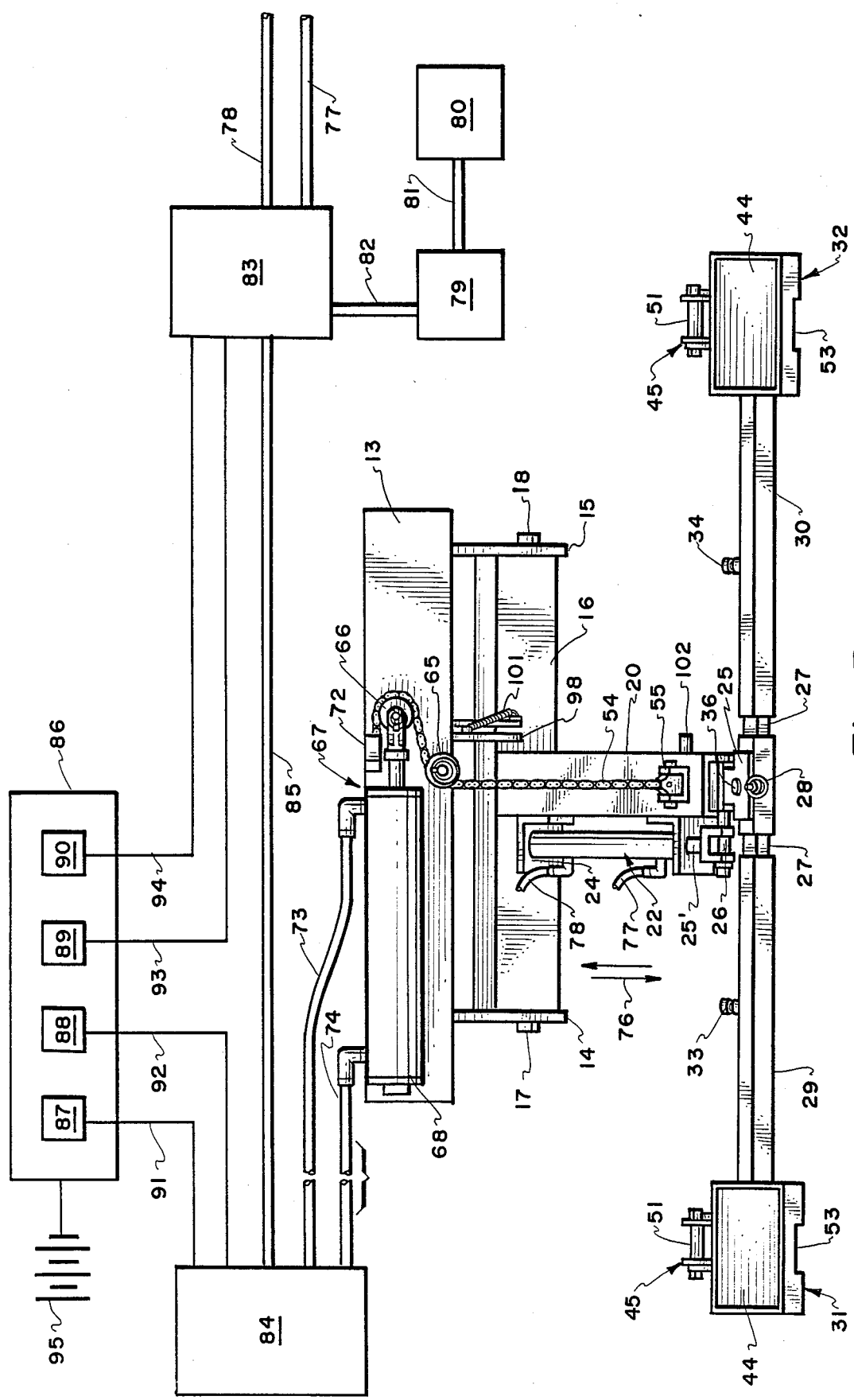
FIG. 3 is a front elevational view taken on line 3—3 of FIG. 2 partly in schematic.

Referring now to FIG. 1 of the drawing, a tow vehicle 10, such as a recreational vehicle, is shown towing a conventional automobile 11, such as a front wheel drive vehicle, using towing apparatus 12 in accordance with the teachings of the invention.

The preexisting undercarriage or frame 13 of vehicle 10 is shown in FIG. 2. A pair of downwardly extending brackets 14, 15 (see also FIG. 3) extend from frame 13 to a tubular member 16 (FIG. 4) having bearing members 17, 18 at each bracket 14, 15, respectively, thereby permitting member 16 to rotate on brackets 14, 15 as will be discussed. Also, as seen in FIG. 2, each bracket 14, 15 is welded as at welds 19, to frame 13.

Figure 4:
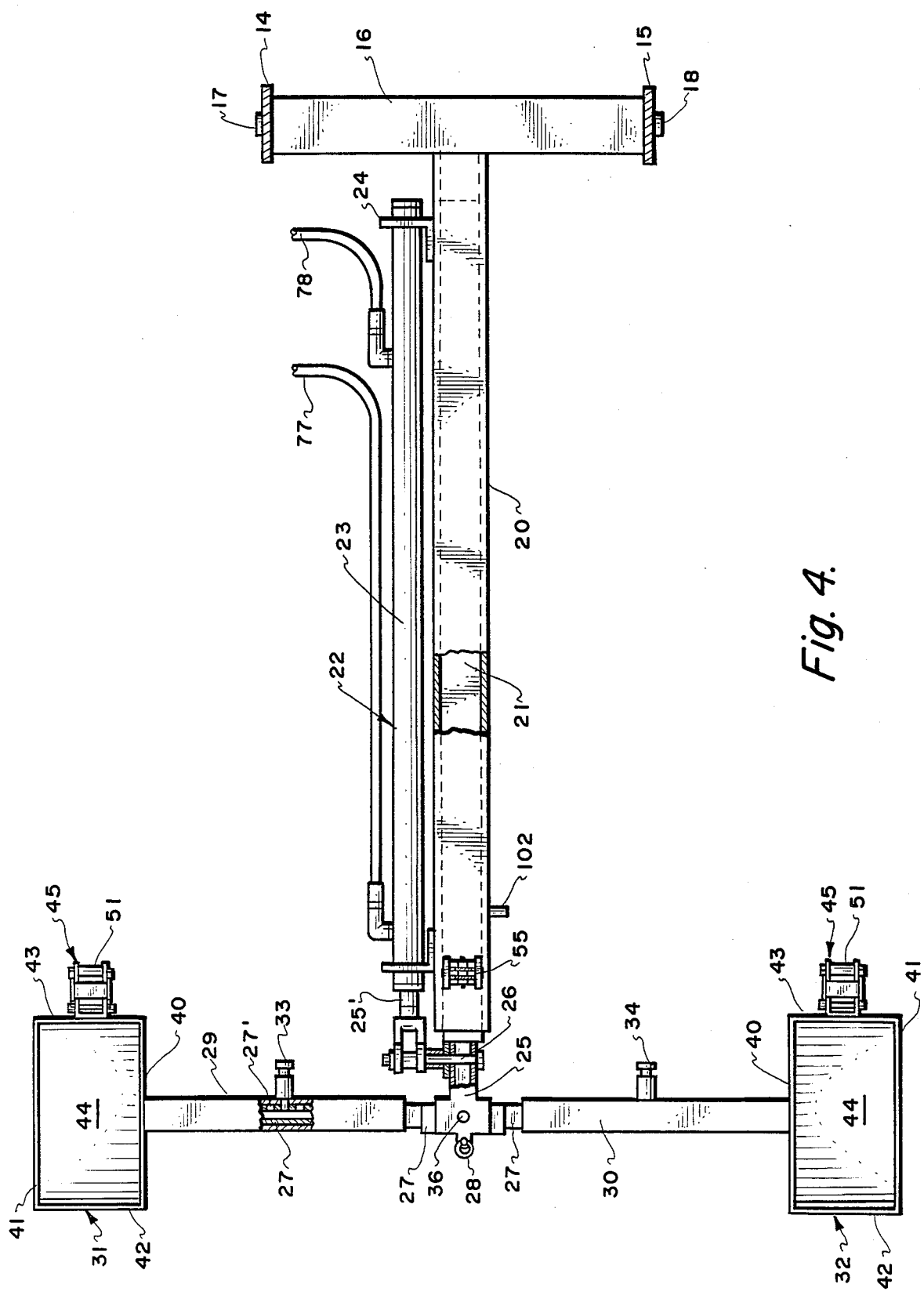
FIG. 4 is a top plan view taken on line 4—4 of FIG. 2.

An elongated hollow tubular member 20 (FIG. 2) extends from and is integral with tubular member 16 and, extends longitudinally along the bottom of vehicle 10 along generally the central axis thereof. A rod member 21 is telescopingly mounted within tubular member 20. As seen in FIG. 4, a ram 22 extends along and generally parallel to tubular member 20. Ram 22 includes a main housing 23 secured at one end to a flange 24 welded or otherwise secured to the outer surface of tubular member 20. A ram rod 25' is reciprocal within main housing 23 extending thereout and having a connecting member 26 connected to telescoping rod member 21. A pair of hydraulic lines 77, 78 are coupled to ram 22 extending to a suitable source of hydraulic fluid and suitable solenoid switches (not shown), which may be mounted on vehicle 10, for selectively actuating ram 22 to move rod 25' into and out of main housing 23, as will be discussed.

Figure 5:
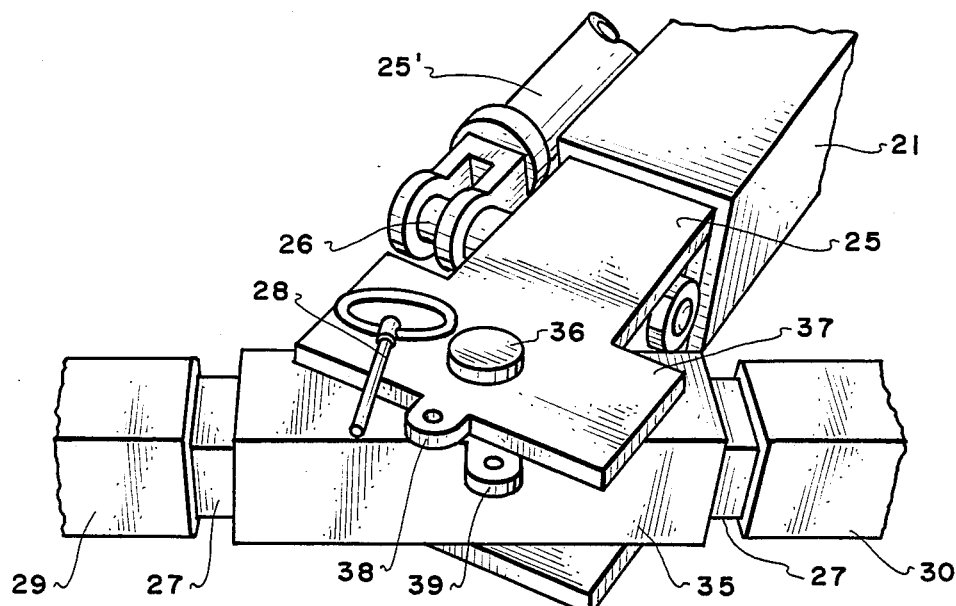
FIG. 5 is a detailed perspective view of the front portion of the apparatus of FIGS. 2 to 4.

Rod 25' extends to and is removably secured to a cross-rod 27 (see also FIG. 5). Rod 27 extends within a sleeve 35 having a headed screw 36 extending through one end 37 of rod 21. End 37 has an apertured boss 38 adapted to be aligned with an apertured boss 39 on sleeve 35 for receiving a removable pin 28 extending through the aligned apertures in bosses 38, 39 as shown, thereby allowing the rods 25, 27 to pivot or swivel about an angle of about 30 degrees with respect to each other when pin 28 is removed.

Thus, cross-rod 27, and apparatus connected thereto as will be discussed, can be fixedly mounted to rod 25. Also, cross-rod 27 can pivot about rod 25.

Each end of cross-rod 27 is telescopingly received in a pair of tubular members 29, 30 (FIG. 4) having wheel supports 31, 32 fixedly secured to each tubular member 29, 30 respectively. These members 29, 30 may be telescopingly adjusted with respect to cross-rod 27 by a pair of spring biased lock pins 33, 34, associated with each member 29, 30, respectively. The pins are pulled outwardly, members 29, 30 moved to the desired location, then released to lock against cross-rod 27. Of course, any suitable means for accomplishing such manual telescoping adjustment may be provided and suitable spaced holes, such as holes 27', may be provided along each cross-rod 27, for receiving one end of each pin 33, 34 therein to assist in such locking adjustment.

Figure 6:
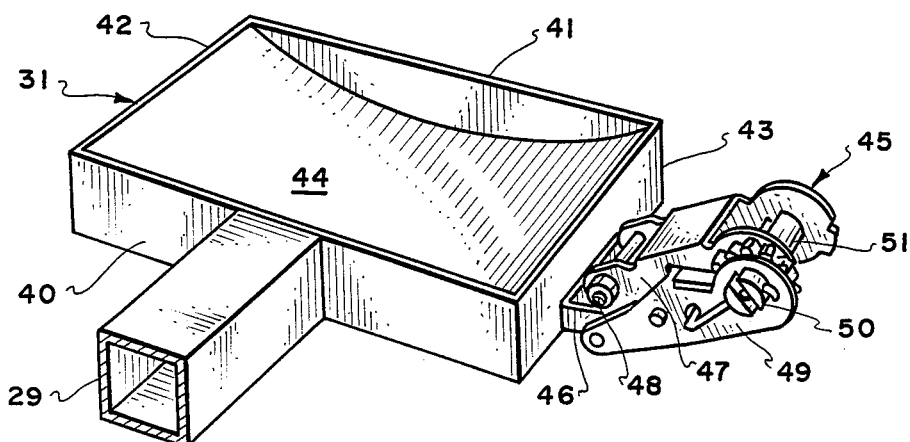
FIG. 6 is a detailed view of one of the wheel supports of the apparatus of FIGS. 2 to 4.
Figure 7:
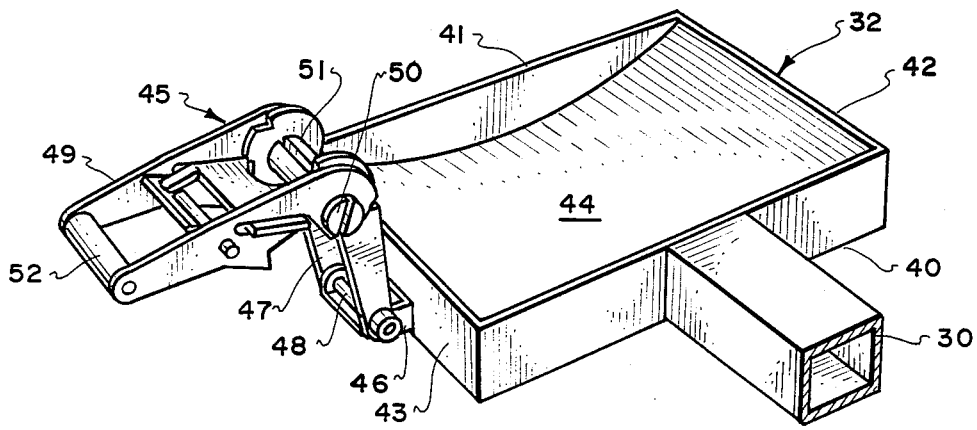
FIG. 7 is a detailed view of the other of the wheel supports of the apparatus of FIGS. 2 to 4.
Figure 8:
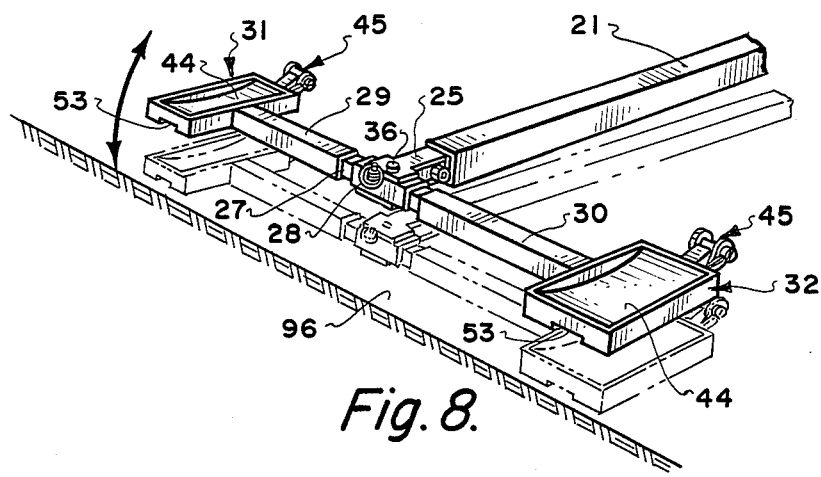
FIG. 8 is a perspective view of the front of the apparatus of FIGS. 2 to 4 shown in slightly raised position.

Each wheel support 31, 32, such as wheel support 31 (FIG. 6) is generally rectangular and includes spaced side walls 40, 41 interconnected via end walls 42, 43. The inner surface between end walls 42, 43 is concave or curved, as at curved inner wall 44, for receiving therein the wheel of the vehicle being towed as will be discussed. Wheel supports 31, 32 may be welded or otherwise secured to its respective member 29, 30. As seen in FIGS. 6 and 7, a vehicle securement member 45 may be provided at each wheel support 31, 32. Each member 45 includes a first bracket portion 46 secured to wall 43, as by welding, a second bracket portion 47 (FIG. 7) pivotally connected at pivot 48 to first bracket portion 46 and a third bracket portion 49 pivotally connected at pivot 50 to second bracket portion 47. Pivot 50 includes a spool 51 mounted between the arms of third bracket portion 49 with a roller 52 at the end thereof. In this manner, a strap 97 (FIG. 1) such as one of seat belt-type material, may be secured to the spools 51, and pulled about the rollers 52 of each securement member 45, up over the tire of the vehicle being towed, under each wheel support 31, 32 (which may be notched on the underside at notch 53-FIG. 8), with the bracket portions of members 45 pivoted to the desired position. The securement members 45 may be conventional ratchet-type binders, self-locking in any desired position, as for example those binders manufactured by Seldon Binders and sold under the trade name Seldon. Of course, any suitable type of tie-down may be used.

Figure 9:
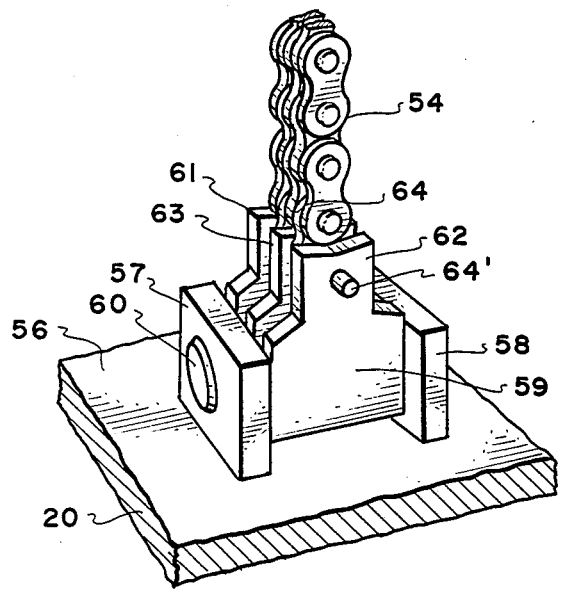
FIG. 9 is a detailed perspective view of the top of the main elongated member of the apparatus of FIGS. 2 to 4.

As seen in FIGS. 2 and 3, a chain 54 may be used to raise and lower member 20 and its associated apparatus about bearing members 17, 18. A bracket 55 is provided on the upper surface 56 of member 20 (see also FIG. 9) welded or otherwise secured thereto. Bracket 55 includes a pair of spaced flanges 57, 58 having a block 59 pivotally mounted therebetween via pivot pin 60. Pin 60 may be removable so as to replace chain 54, if desired. A pair of spaced flanges 61, 62 are welded or otherwise secured to the top of block 59 receiving therebetween a plate 63 secured to one link 64 of chain 54. Plate 63 is pivotally mounted between flanges 61, 62 via pin 64'. It can be easily seen that chain 54 can pivot in a direction transverse to the longitudinal axis of member 20 via pin 64' whereas it can also pivot in a direction parallel to the longitudinal axis of member 20 via pin 60.

Figure 10:
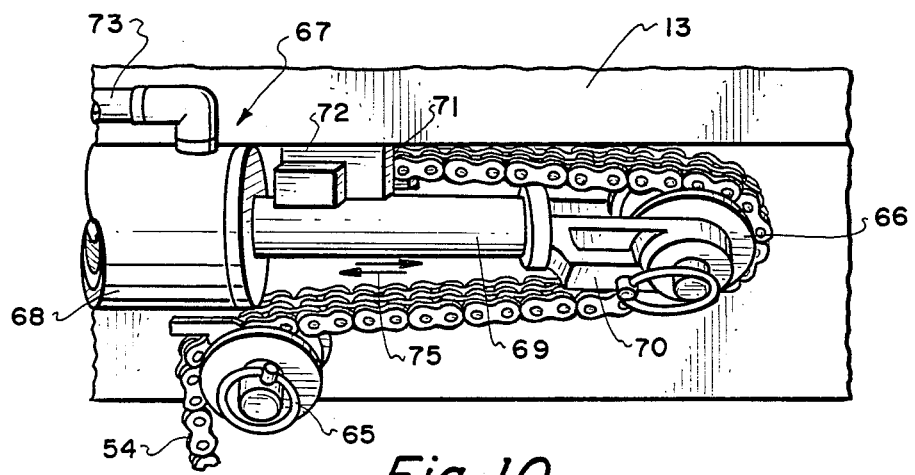
FIG. 10 is a detailed view of a portion of the apparatus of FIG. 3.

As seen in FIG. 3, chain 54 extends about the sheave of a pulley 65 (see also FIG. 10) mounted to frame 13, then about the sheave 66 of a ram 67 mounted to frame 13. As seen in FIG. 10, ram 67 includes a main body portion 68 having a reciprocal ram shaft 69 extending thereout coupled to a bracket 70 having sheave 66 journalled therebetween. The terminal end 71 of chain 54 is secured to a bracket 72 mounted to frame 13. As seen in FIGS. 3 and 10, a pair of hydraulic lines 73, 74 are fluidly coupled to the main body portion of ram 67 for selectively providing hydraulic fluid thereto and, thus, selectively reciprocating ram shaft 69. This of course moves the same inwardly and outwardly in the direction of arrows 75. This selectively moves bracket 70 inwardly and outwardly in the same direction thus pulling chain 54 about roller 65 and upwardly and downwardly in the direction of arrows 76 in FIG. 3. This of course raises and lowers tubular members 20 and its associated apparatus.

As seen schematically in FIG. 3, a tank or reservoir 79 is provided, mounted to vehicle 10 at any suitable location, for storing hydraulic fluid. A conventional pump 80 is coupled to tank 79 via fluid lines 81. Fluid line 82 fluidly connects tank 79 to a conventional solenoid valve 83 having aforementioned hydraulic fluid lines 77, 78 also fluidly coupled thereto. A second conventional solenoid valve 84 may also be provided having hydraulic fluid lines 73, 74 fluidly coupled thereto with a fluid line 85 interconnecting valves 83, 84. A panel 86 is also mounted on frame 13 at any suitable location having a plurality of switches, such as switches 87 to 90, mounted thereon with electrical conduits 91, 92 interconnecting switches 87, 88, respectively, to valve 84, and electrical conduits 93, 94 interconnecting switches 89, 90, respectively, to valve 83. A suitable source of electricity 95, which may be the vehicle battery or an auxillary battery, is electrically coupled to panel 86 and the switches therein to provide current. Of course, any suitable electrical system or arrangement may be used to carry out the teaching of the invention and suitable circuit breakers and the like may be provided.

Figure 11:
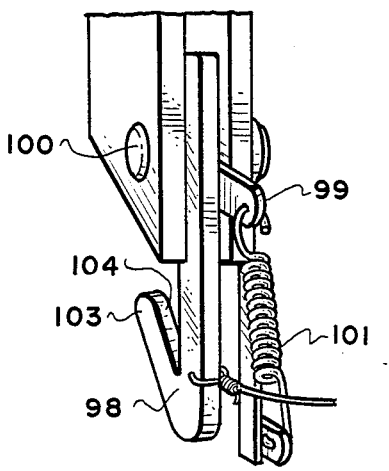
FIG. 11 is a detailed view of a portion of the apparatus of FIGS. 2 and 3.

As seen in FIG. 11, a spring biased hook 98 may be provided on the frame 13 (see also FIGS. 2 and 3). Hook 98 is pivotally mounted to bracket 99 extending downwardly from frame 13 via pivot pin 100. Spring 101 biases hook 98 inwardly of vehicle 10. A projecting knob 102 extends laterally from member 20 (see also FIG. 2). When member 20 moves upwardly with the towed vehicle mounted thereon, knob 102 engages and rides along surface 103 of hook 98 and enters into notched area 104. This takes the weight off of the hydraulic mechanism when the vehicle is being towed.

In operation, ram 67 is actuated via solenoid valves 83, 84 and the electrical apparatus associated therewith to move chain 54 to lower tubular member 20 and its related apparatus from a position stowed under vehicle 10 (see the dotted lines 20' in FIG. 2) to the solid line position of FIG. 2. The rod member 21 is in the position shown in FIG. 4. Ram 22 is now actuated via lines 77, 78 and valves 83, 84 to extend rod 25', and of course the apparatus connected thereto, to the position shown in FIG. 1, the wheel supports 31, 32 resting on the surface 96.

The vehicle or auto 11 desired to be towed is driven onto the apparatus 12. Pin 28 may be removed to swivel cross-rod 27 to lineup with the supports 31, 32 with the vehicle wheels. The vehicle wheels are then driven onto and rest on the curved surfaces 44 of each wheel support 31, 32 as shown in FIG. 1. Straps 97 (FIG. 1) may now be connected to each vehicle securement member 45 and brought around and over each tire, under each wheel support 31, 32 into the notch 53 under each wheel support 31, 32, then secured back to each member 45 as is well known in the art. The pin 28 may now be replaced by straightening out member 20 with respect to cross-rod 27 using the two vehicle 10.

Ram 22 is now reactivated via actuation of solenoid valves 83, 84 through control panel 86 and the related electrical apparatus to pull chain 54 in the up direction thereby raising member 20 and its related apparatus including of course vehicle 11 under hook 98 so that knob 102 hooks into hook 98. Thus, the front wheels of the vehicle being towed are off of the ground, no mileage is placed on the odometer when towed (if vehicle 11 is a front wheel drive—if vehicle 11 is a rear wheel drive, the driveline of the auotmatic transmission would have to be disconnected and the same towed in like manner). Vehicle 10 may now be driven to tow the vehicle 11. When the desired towing location is reached, hook 98 is released and disengaged from knob 102, ram 67 is activated to lower member 20, the straps 97 are removed from the wheels of the towed auto 11, the auto 11 is driven off of supports 31, 32 and the ram 67 is again actuated to raise member 20 to the dotted line position 20' shown in FIG. 2 with ram 25' also actuated to return cross-rod 27 to the FIG. 4 position stored under the vehicle 10.

The control panel 86 may be mounted at any suitable location on vehicle 10, such as in an interior compartment at the rear of vehicle 10. Of course, the switches may also be mounted in the cab or driver's compartment of the vehicle, if desired.

The entire apparatus 12 is stored under the vehicle 10 blending into the undercarriage thereof and thus is always available and easily stored. No trailer license is required.

Any suitable materials may be used such as aluminum, steel, etc. It can be seen that there is described apparatus for towing a vehicle without need of a tow bar. There is no affecting of the odometer reading of the towed vehicle. The apparatus requires no license and can easily be stowed under the towing vehicle until needed.

Although a specific embodiment of the invention is disclosed, the embodiment described is only exemplary of the invention and the invention is to be limited only by the appended claims.

Since certain changes may be made in the above apparatus without departing from the scope of the invention herein involved, it is intended that all matter contained in the above description and shown in the accompanying dreawings shall be interpreted as illustrative and not in a limiting sense.

I claim:

1. An apparatus for towing a second vehicle, which is designated the towed vehicle, which apparatus is stowed underneath a first vehicle, designated the towing vehicle, said towing vehicle having an undercarriage and a frame, said apparatus comprising:

a first elongated hollow member pivotally mounted to the undercarriage of the towing vehicle extending generally longitudinally along the central longitudinal axis of the towing vehicle from a first position forwardly of the rear end of the towing vehicle to a second position adjacent the rear end of the towing vehicle and pivotally movable from a first stowed position generally parallel to the plane of the undercarriage of the towing vehicle to a second operative position angled downwardly toward the rear of said towing vehicle;

a second elongated member telescopingly mounted in said first first elongated member and movable from a first position disposed internally of said first elongated member to a second position extending out of said first elongated member away from the rear end of said towing vehicle;

said second elongated member having an end for mounting another member thereto;

first elongated member raising and lowering means operatively engaging said first elongated member for selectively raising and lowering the same;

telescoping and extending means operatively engaging said first and second elongated members for selectively telescoping and extending said second elongated member with respect to said first elongated member;

a cross-member secured to the end of said second elongated member extending out of said first elongated member and extending generally transverse thereto;

a first towed vehicle wheel support member mounted at one end of said cross-member for receiving one of the front wheels of the vehicle to be towed thereon; and a second towed vehicle wheel support mounted at the other end of said cross-member for receiving the other of the front wheels of the towing vehicle to be towed thereon;

wherein said first elongated member raising and lowering means includes a chain having one end fixed to said first elongated member and its other end fixed to the frame of said vehicle, and said raising and lowering means further includes a pulley rotatably mounted on the frame of said towing vehicle receiving said chain thereover, an hydraulically actuated ram mounted on the frame of said towing vehicle, which ram has a piston rod extending in a direction generally parallel to the plane of the undercarriage of the towing vehicle and having a sheave about which said chain extends between said pulley and the other end of said chain whereby, actuation of said last-mentioned ram moves said chain to thereby selectively raise and lower said first elongated member connected to said chain.

2. In the apparatus of claim 1 wherein each of said wheel supports is longitudinally adjustable with respect to said cross-member.

3. In the apparatus of claim 1 wherein said cross-member is pivotally connected to said second elongated member.

4. In the apparatus of claim 1 wherein each of said wheel supports has an upper inner surface which is concave for receiving the wheel of the vehicle to be towed therein.

5. In the apparatus of claim 1 including towed vehicle wheel securement means connected to each of said wheel supports for securing each of said towed vehicle wheels thereto.

6. In the apparatus of claim 5 wherein each of said securement means includes a flexible strap pivotally connected to each of said wheel supports adapted to extend about the wheels of the towed vehicle, under said wheel support, then back to and secured to said securement means.

7. In the apparatus of claim 6 wherein said securement means includes a notch at least as wide as said strap in the under surface of each of said wheel supports opposite the side having said strap pivotally connected thereto.

8. In the apparatus of claim 1 including a spring biased hook mounted on the undercarriage of said tow vehicle and extending downwardly with respect thereto, and a knob mounted on said first elongated member extending laterally with respect thereto, said hook being adapted to engage said knob and hold said first elongated member in said first position parallel to said undercarriage until released therefrom.

9. In the apparatus of claim 1 wherein said telescoping and extending means includes an hydraulically actuated ram coupled to said second elongated member.

* * * * *